(12) United States Patent
Tokumoto

(10) Patent No.: US 10,061,545 B2
(45) Date of Patent: Aug. 28, 2018

(54) PRINTING APPARATUS AND METHOD OF ESTIMATING PRINT TIME OF PRINT JOB

(71) Applicant: CANON KABUSHIKI KAISHA, Tokyo (JP)

(72) Inventor: Hirokazu Tokumoto, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/069,495

(22) Filed: Mar. 14, 2016

(65) Prior Publication Data

US 2016/0283171 A1 Sep. 29, 2016

(30) Foreign Application Priority Data

Mar. 24, 2015 (JP) ................................. 2015-061664

(51) Int. Cl.
*G06F 3/12* (2006.01)
*H04N 1/00* (2006.01)

(52) U.S. Cl.
CPC .......... *G06F 3/1207* (2013.01); *G06F 3/1244* (2013.01); *G06F 3/1259* (2013.01); *G06F 3/1285* (2013.01)

(58) Field of Classification Search
CPC .... G06F 3/1203; G06F 3/1207; G06F 3/1217; G06F 3/1259; G06F 3/125; G06F 3/126; G06F 3/1284; G06F 3/1285; G06F 3/1288; B41J 2/155; B41J 2/2107; B41J 2/2128
USPC ..................... 358/1.1, 1.9, 1.12–1.18; 347/14
See application file for complete search history.

(56) References Cited

U.S. PATENT DOCUMENTS

| | | | |
|---|---|---|---|
| 6,618,167 B1 * | 9/2003 | Shah .................... | G06F 3/1205 358/1.13 |
| 8,472,042 B2 | 6/2013 | Tokumoto | |
| 8,908,196 B2 | 12/2014 | Hashimoto | |
| 2005/0190383 A1 * | 9/2005 | Levin .................... | G06F 3/1214 358/1.1 |
| 2010/0027047 A1 * | 2/2010 | Hikosaka ........... | H04N 1/00244 358/1.14 |
| 2010/0238484 A1 * | 9/2010 | Komine ................ | G06F 3/1204 358/1.15 |
| 2012/0062919 A1 * | 3/2012 | Hashimoto ........... | G06F 3/1207 358/1.12 |
| 2012/0236342 A1 * | 9/2012 | Price .................... | G06F 3/1211 358/1.13 |
| 2014/0198341 A1 * | 7/2014 | Nakayama ........... | G06F 3/1222 358/1.15 |

(Continued)

FOREIGN PATENT DOCUMENTS

JP 2012-63951 A 3/2012

*Primary Examiner* — Gabriel Garcia
(74) *Attorney, Agent, or Firm* — Fitzpatrick, Cella, Harper & Scinto

(57) ABSTRACT

A printing apparatus includes a memory and a controller that receives, from an external apparatus, a print job for printing images on a plurality of sheets, estimates a print time of the received print job, and executes the received print job. The memory stores predetermined values which the controller uses for estimating the print time of the received print job. The stored predetermined values include (i) one predetermined sheet change time for a sheet change from a sheet of a first size to a next sheet of a second size larger than the first size, and (ii) another predetermined sheet change time for another sheet change from a sheet of the second size to a next sheet of the first size.

37 Claims, 9 Drawing Sheets

(56) References Cited

U.S. PATENT DOCUMENTS

2015/0103364 A1* 4/2015 Abe ................... H04N 1/00477
358/1.13

* cited by examiner

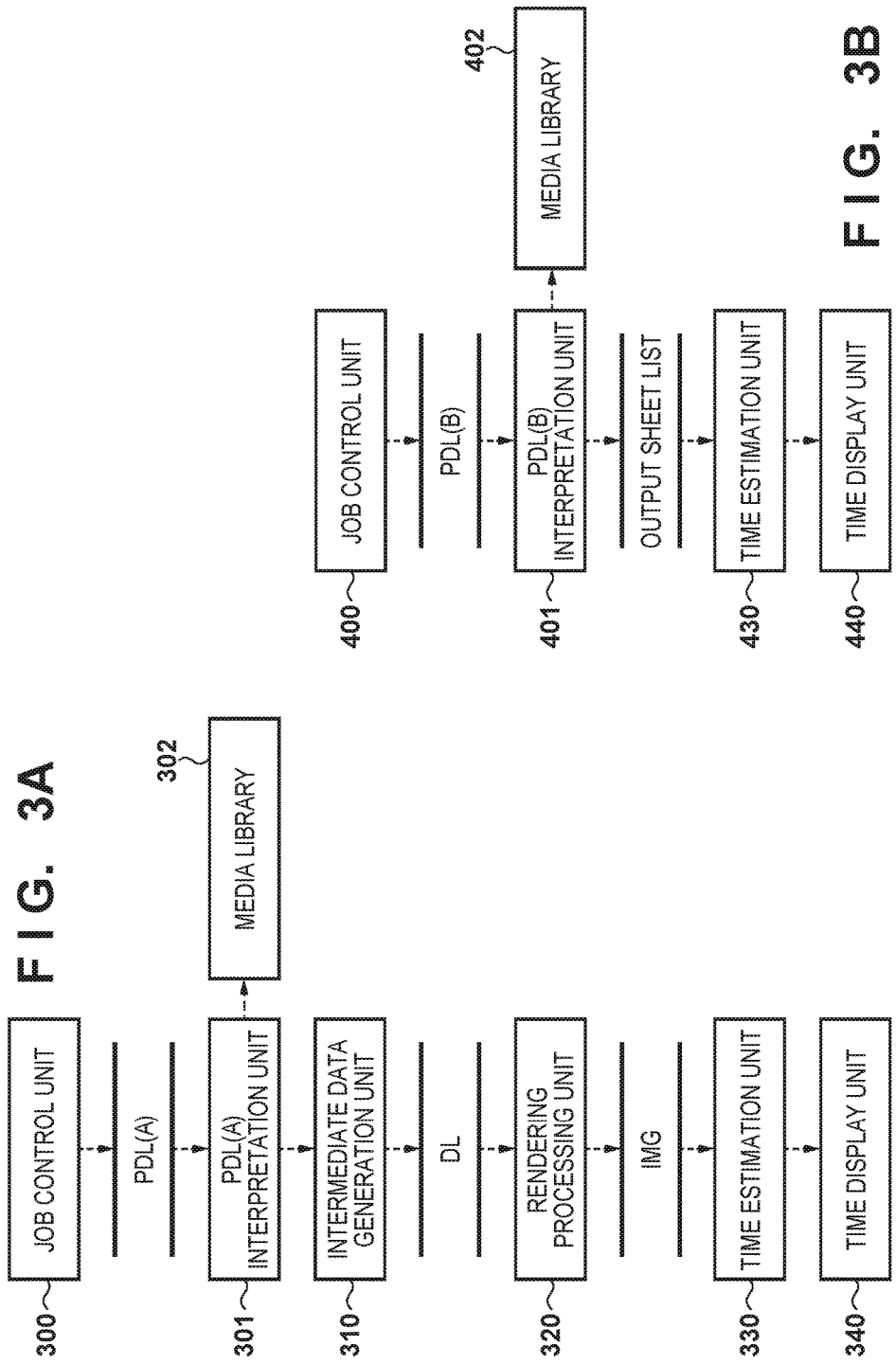

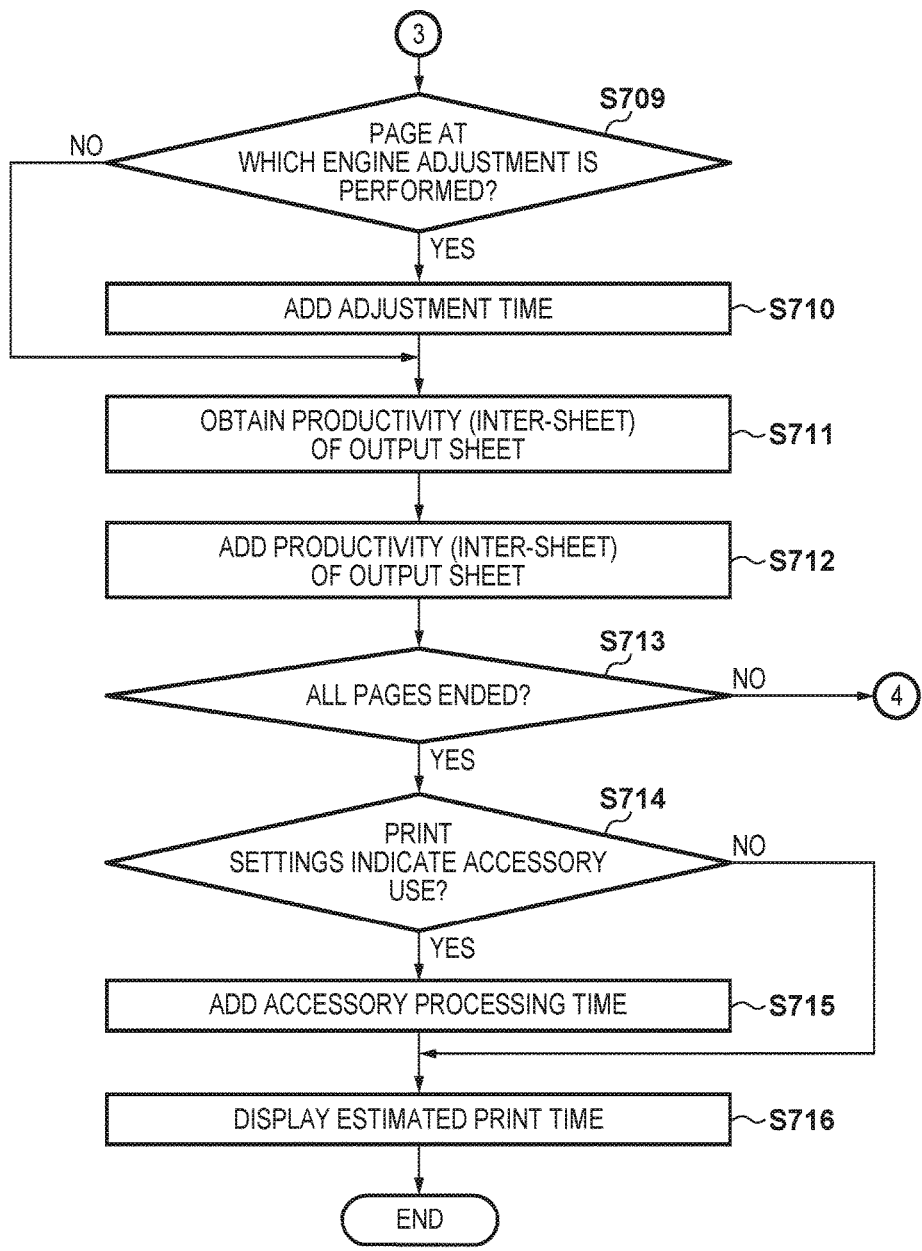

FIG. 6A

```
:
<</Type/Page/MediaBox[0 0 612 792]
/Rotate 0/Parent 3 0 R
/Resources<</ProcSet[/PDF /ImageC/Text]
/ColorSpace1142 0 R
/ExtGState1143 0 R
/XObject1144 0 R
/Font 1145 0 R
endobj
3 0 obj
<< /Type /Pages /Kids [
5 0 R
] /Count 1
/Rotate 0>>
Endobj
:
```

FIG. 6B

```
<FixedPage Width="1122" Height="793" xmlns="http://schemas.microsoft.com/xps/2005/06"
xml:lang="und">
  <!-- Microsoft XPS Document Converter (MXDC) Generated! Version: 0.3.7600.16385 -->
  <Path Data="M 70.08,143.2 L 1075.68,143.2 1075.68,155.36 70.08,155.36 z" Fill="#ffffffff" />
  <Path Data="F1 M 50.4,155.2 L 1075.68,155.2 1075.68,299.36 50.4,299.36 z" Fill="#ffffff99" />
  <Path Data="F1 M 50.4,299.2 L 1075.68,299.2 1075.68,443.36 50.4,443.36 z" Fill="#ffffffff" />
  <Glyphs Fill="#ff0000ff" Clip="M 97.92,144.8 L 132,144.8 132,153.28 97.92,153.28 z"
FontUri="/Documents/1/Resources/Fonts/
  A2714369-AC29-4046-8E7D-EA4BAF3C12F6.odttf" FontRenderingEmSize="7.99969"
StyleSimulations="None" OriginX="97.92"
  OriginY="151.04" Indices="43;82;78;78;68;76;71;82" UnicodeString="Hokkaido" />
  <Glyphs Fill="#ff0000ff" FontUri="/Documents/1/Resources/Fonts/A2714369-AC29-4046-
8E7D-EA4BAF3C12F6.odttf"
  FontRenderingEmSize="7.99969" StyleSimulations="None" OriginX="134.88"
OriginY="151.04"
  InDices="36;82;80;82;85;76,132;44;90;68;87;72,132;48;76;92;68;74;76,132;36;78;76;87;68"
UnicodeString="AomoriIwateMiyagiAkita" />
  :
```

FIG. 7A

| | |
|---|---|
| PAGE 1 ▨▨▨▨▨▨▨▨▨▨ | A4 THICK PAPER |
| PAGE 2 ▨▨▨▨▨▨▨▨▨▨ | A4 NORMAL PAPER |
| PAGE 3 ▨▨▨▨▨▨▨▨▨▨ | A4 NORMAL PAPER |
| PAGE 4 ▨▨▨▨▨▨▨▨▨▨ | A4 NORMAL PAPER |
| PAGE 5 ▨▨▨▨▨▨▨▨▨▨▨▨▨▨▨▨▨▨ | A3 NORMAL PAPER |
| PAGE 6 ▨▨▨▨▨▨▨▨▨▨ | A4 NORMAL PAPER |
| PAGE 7 ▨▨▨▨▨▨▨▨▨▨ | A4 THICK PAPER |

FIG. 7B

ESTIMATED TIME = FPOT
+ A4 THICK PAPER INTER-PAPER
+ THICK PAPER → NORMAL PAPER SWITCHING TIME
+ A4 NORMAL PAPER INTER-PAPER
+ A4 NORMAL PAPER INTER-PAPER
+ COLOR ADJUSTMENT TIME
+ A4 NORMAL PAPER INTER-PAPER
+ A4 → A3 SWITCHING TIME
+ A3 NORMAL PAPER INTER-PAPER
+ A3 → A4 SWITCHING TIME
+ A4 NORMAL PAPER INTER-PAPER
+ NORMAL PAPER → THICK PAPER SWITCHING TIME
+ A3 NORMAL PAPER INTER-PAPER
+ STAPLE PROCESSING TIME

FIG. 8

| | PRE-PROPOSAL (POST-RIP ESTIMATION) | POST-PROPOSAL |
|---|---|---|
| PDF DATA (20 PAGES) | 4.5 | 0.2 |
| Excel DATA (20 PAGES) | 3.9 | 0.1 |
| Illustrator DATA (8 PAGES) | 3.3 | 0.2 |

PRINTING APPARATUS AND METHOD OF ESTIMATING PRINT TIME OF PRINT JOB

BACKGROUND OF THE INVENTION

Field of the Invention

The present invention relates to a printing apparatus and a method of estimating a print time of a print job.

Description of the Related Art

Upon receiving a print job from an external apparatus, the image forming apparatus interprets page description language (PDL) data included in the print job, and determines an output sheet onto which an image is to be printed. Then, the image forming apparatus rasterizes the PDL data into a bitmap image. Thereafter, the image forming apparatus prints an image based on the bitmap image onto the output sheet. It is beneficial to estimate the time required for this print processing sequence prior to print processing being executed and to present the estimated time to the user. Japanese Patent Laid-Open No. 2012-063951 discloses a method of using information (sheet type, number of copies, double/single sided printing) set for the print job to estimate the time required to execute the print processing of a print job, prior to the execution of print processing.

However, there are cases where the setting information for the print job is updated with regard to a specific page included in the print job. Specifically, there are cases where the setting information for the specific page and the setting information for the print job excluding the specific page are different. In the case of such a print job, pages that have different settings cannot be reflected in the estimated time, and the accuracy of the estimated time obtained by using the method disclosed in Japanese Patent Laid-Open No. 2012-063951 is reduced.

SUMMARY OF THE INVENTION

The present invention provides a printing apparatus and a method for estimating a print time of a print job.

The present invention has the following configuration.

According to a first aspect of the present invention, there is provided a printing apparatus comprising: a receiving unit configured to receive a print job of a plurality of pages from an external apparatus; an estimation unit configured to estimate a print time of the received print job; an acceptance unit configured to accept a print instruction for the print job of which the print time has been estimated, from a user; and a printing unit configured to print images of the plurality of pages onto sheets, in accordance with the accepted print instruction, wherein the estimation unit determines whether or not sizes of the sheets on which the images of the plurality of pages are to be printed change during the printing, and estimates the print time based on at least the determination.

According to a second aspect of the present invention, there is provided a printing apparatus comprising: a receiving unit configured to receive a print job of a plurality of pages from an external apparatus; an estimation unit configured to estimate a print time of the received print job; an acceptance unit configured to accept a print instruction for the print job of which the print time has been estimated, from a user; and a printing unit configured to print images of the plurality of pages onto sheets, in accordance with the print instruction being accepted, wherein the estimation unit determines whether or not types of the sheets on which the images of the plurality of pages are to be printed change during the printing, and estimates the print time based on at least the determination.

According to a third aspect of the present invention, there is provided a printing apparatus comprising: a receiving unit configured to receive a print job of a plurality of pages from an external apparatus; an estimation unit configured to estimate a print time of the received print job; an acceptance unit configured to accept a print instruction for the print job of which the print time has been estimated, from a user; and a printing unit configured to print images of the plurality of pages onto sheets, in accordance with the print instruction being accepted, wherein the estimation unit determines whether or not adjustment of the printing unit will be performed during the printing, and estimates the print time based on at least the determination.

According to the present invention, the estimation accuracy of the time required for print processing is improved by obtaining an estimated time based on setting information for each page. Furthermore, estimation accuracy is improved while at the same time being able to quickly calculate the estimated time with respect to an input job by preventing an increase in the time required for estimation processing.

Further features of the present invention will become apparent from the following description of exemplary embodiments with reference to the attached drawings.

BRIEF DESCRIPTION OF THE DRAWINGS

FIGS. 3A and 3B are software configuration diagrams showing an embodiment of the image forming apparatus according to the embodiment of the present invention.

FIGS. 5A and 5B show a flowchart regarding processing from reading of an output sheet list until display of an estimated print time according to the embodiment of the present invention.

FIGS. 6A and 6B are schematic diagrams showing PDL included in a print job according to the embodiment of the present invention.

FIGS. 7A and 7B are schematic diagrams showing an output sheet list included in a print job and estimated time calculation according to the embodiment of the present invention.

FIG. 8 is a table showing results of an effect of shortening the time from print job input until estimated print time display according to the embodiment of the present invention.

DESCRIPTION OF THE EMBODIMENTS

Configuration of Image Forming Apparatus

Figure 1:
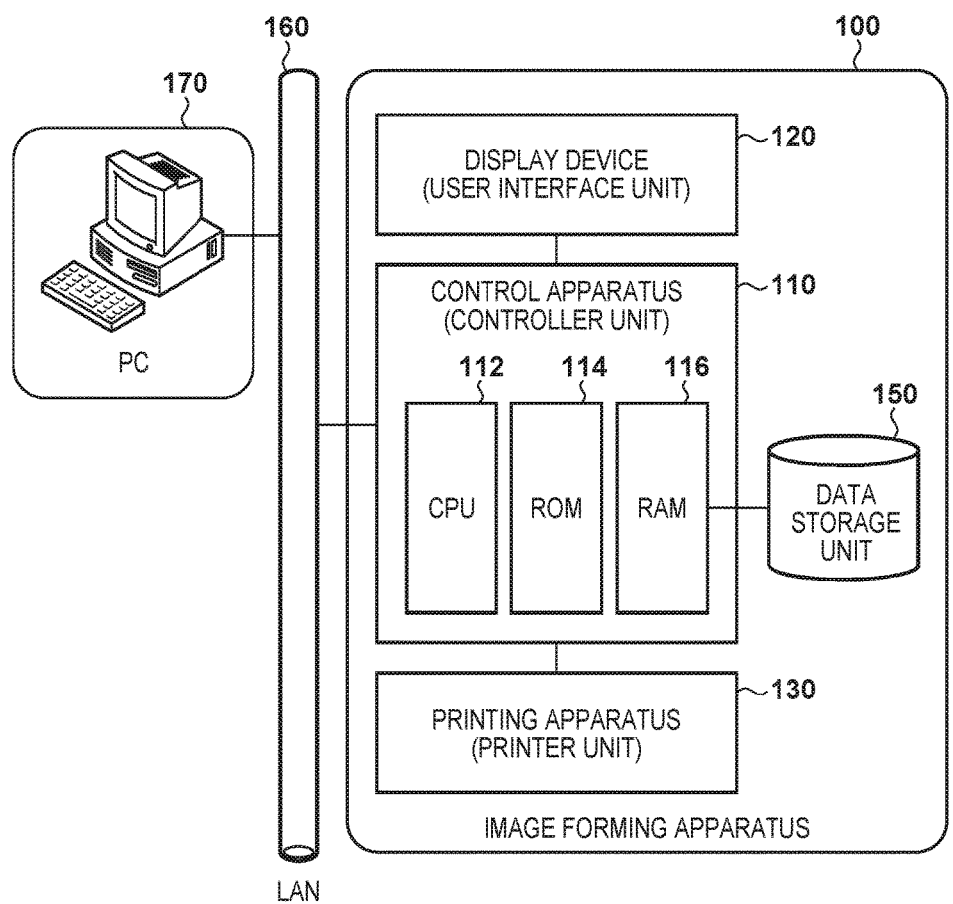
FIG. 1 is a hardware configuration diagram showing an embodiment of an image forming apparatus according to an embodiment of the present invention.

Modes for carrying out the present invention will be described below using the drawings. FIG. 1 is a hardware configuration diagram showing an image forming apparatus relating to the present invention to which a controller has been mounted as an electronic component and peripheral devices thereof. An image forming apparatus 100 is connected to a host computer (PC) 170 via a local area network (LAN) such as Ethernet (registered trademark). The image forming apparatus 100 is configured so as to include a printing apparatus 130, a display apparatus 120, a data storage unit 150, and further include a control apparatus (controller unit) 110 that controls the above-mentioned constituent elements. The control apparatus 110 has a CPU 112, a ROM 114, a RAM 116, and the like, and the CPU 112 integrally controls the entire image forming apparatus 100 based on programs stored in the ROM 114 or programs stored in another storage medium. A configuration is employed, for example, in which the control apparatus 110 loads, to the CPU 112, predetermined programs for performing PDL interpretation processing, rendering processing, and processing to calculate an estimated print time. The control apparatus 110 generates a bitmap image based on the PDL data and stores the bitmap image data in the data storage unit 150. Then, the control apparatus 110 supplies the stored bitmap image data to the printing apparatus 130. Note that, in the present embodiment, the CPU 112 in the control apparatus 110 performs rendering processing (so-called "software rendering"). However, a raster image processor (RIP) may be provided in the control apparatus 110, and the control apparatus 110 may be configured such that the RIP performs rendering processing (so-called "hardware rendering"). Also, an estimation value (estimated print time) of the required print time of a job written in PDL according to the present embodiment is obtained by the control apparatus 110. For this reason, using the ROM 114 as a storage unit, the ROM 114 stores element times including required output times (productivity) that have been predetermined for each type of sheet and switching times required for switching sheets with different sizes. Furthermore, in the present embodiment, element times include an adjustment time that is required for engine unit adjustment, a first page output time (FPOT: first print output time) calculated for each sheet size and required for output of the first page, and an accessory processing time required for finishing processing or the like. Also, other times required for printing may be included as element times.

The data storage unit 150 stores PDL data received from the host computer (PC) 170 and a file server 180 via the LAN. Also, the data storage unit 150 stores an output sheet list that is generated by the control apparatus 110.

The display apparatus 120 provides a user interface unit to the user of the image forming apparatus 100. The control apparatus 110 displays preview information and the estimated print time of the print job to the user via the user interface.

The printing apparatus 130 prints an image based on bitmap image data supplied by the control apparatus 110, onto a recording medium (such as paper or an OHP sheet). In the present embodiment, the image forming apparatus 100 is a multi-function peripheral (MFP), but may be a single function printer (SFP). Also, various types of print methods including an electrophotographic method, an inkjet method, and the like are conceivable as the print method of the printing apparatus 130. In the present embodiment, the print method may be a parameter of the estimated print time, but there is no limit on the print method.

Example of Stored Job List Display

Figure 2:
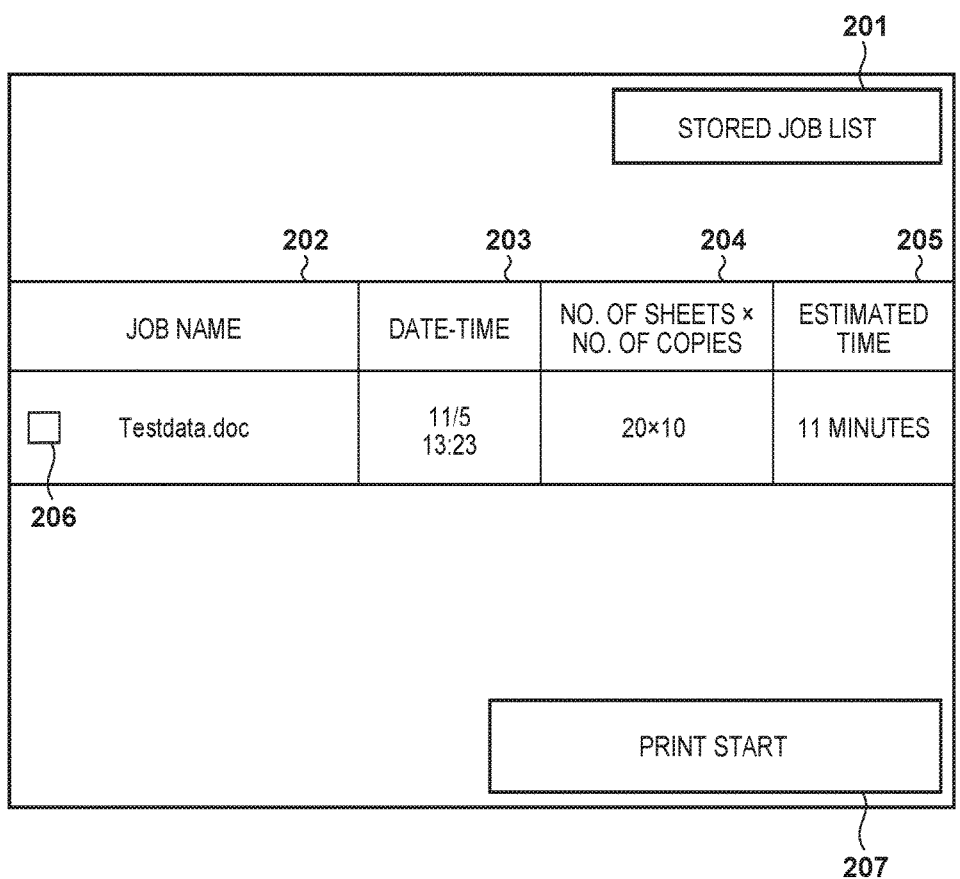
FIG. 2 is a diagram of a user interface screen display showing an embodiment of the image forming apparatus according to the embodiment of the present invention.

FIG. 2 is an example of a stored job list displayed on a user interface screen that is displayed to the user by the display apparatus 120 of the image forming apparatus 100. A stored job is, for example, a job that has been created on a PC or the like, transmitted to an image forming apparatus, and is stored in the image forming apparatus. A stored job is, for example, specified via an operation panel (the display apparatus 120) on the image forming apparatus 100 and printing is executed when a user gives an instruction to start printing.

In FIG. 2, a stored job list screen 201 displays a list of print jobs stored in the data storage unit. A print job displayed in the list is displayed in fields belonging to the job including a job name 202, a date-time 203, a number of sheets×number of copies 204, and an estimated time 205. The job name 202 is an input job name that is inherited from the filename of the document. The date-time 203 indicates the time at which the job was input to the image forming apparatus 100. The number of sheets×number of copies 204 is a print setting regarding the input job, and is the number of sheets that are to be printed determined by the result of analyzing the number of copies designated by the user and the job. The estimated time 205 is the estimated time that is estimated to be required to print the job that has been input. In this way, the estimated time is displayed in association with the print job. An object of this proposal is to accurately and quickly calculate this estimated time. Printing of a stored job is started by selecting a check box 206 of the job displayed in the stored job list 201 and pressing a print start 207 button.

Software Configuration of Image Forming Apparatus

FIGS. 3A and 3B are diagrams showing an example of a software module that operates in the control apparatus 110 of the image forming apparatus 100. The print job generated in the host computer (PC) 170 is transmitted to the image forming apparatus 100 via the LAN. The print job is stored in the data storage unit 150 in the control apparatus 110. The software module shown in FIGS. 3A and 3B is stored in the ROM 114 in the control apparatus 110, and is loaded to the RAM 116 and executed by the CPU 112 at start-up of the PC 170. A job control unit 300 controls the print job stored in the data storage unit 150 from input until output, via means including function calls and message communication. There is a PDL (A) interpretation unit 301 for each type of PDL (e.g., PostScript (registered trademark), PCL (registered trademark), and XPS (registered trademark)) that has been loaded to the image forming apparatus 100. The job control unit 300 determines the type of PDL, and based on the result of the determination, switches between time estimation using the software module configuration shown in FIG. 3A or time estimation using the software module configuration shown in FIG. 3B. For example, in the case of PDLs such as LIPS LX (registered trademark) and PCL (registered trademark) that place a comparatively light processing load on an intermediate data generation unit 310 and a rendering processing unit 320, time estimation is performed using the configuration shown in FIG. 3A. On the other hand, in the case of PDLs such as PostScript (registered trademark), PDF (registered trademark), and XPS (registered trademark) that place a comparatively light processing load on the intermediate data generation unit 310 and the rendering processing unit 320, time estimation is performed using the configuration shown in FIG. 3B.

FIG. 3A is a software module diagram that shows time estimation processing that is performed until rendering processing is performed. The job control unit 300 controls the print job stored in the data storage unit 150 from input until output, via means including function calls and message communication. In accordance with control by the job control unit 300, the PDL interpretation unit 301 reads PDL data from the print job stored in the data storage unit 150, and executes interpretation processing. The PDL interpretation unit 301 determines the output sheet by extracting media size information stipulated by a command in the PDL and requesting the media library 302 for output sheet information regarding a sheet with the size closest to that of the extracted media size. The media library 302 holds information on output sheets supported, that is, useable, by the image forming apparatus. The intermediate data generation unit 310 executes processing according to control by the job control unit 300 and rendering information passed from the PDL interpretation unit 301, generates intermediate data information, and generates configurative elements such as edges, levels, and fill that constitute the intermediate data. The generated intermediate data is stored in the RAM 116 on the control apparatus 110. When one page of intermediate data is generated and stored in the RAM 116, the rendering processing unit 320 reads the intermediate data from the RAM 116, executes rendering processing, and outputs an image. The output image is stored in the data storage unit 150. A time estimation unit 330 estimates a print time based on the information regarding the determined output sheet. A time display unit 340 is a module that displays the estimated time calculated by the time estimation unit 330 on the display apparatus 120.

With this configuration, settings including the sheet size for each page are reflected in the estimated time, and a highly accurate estimated time can be calculated. In the software module configuration shown in FIG. 3A, there are cases where the intermediate data generation unit 310 and the rendering processing unit 320 may be subjected to a heavy processing load depending on the PDL, and thus a longer period of time will be required. Accordingly, the software module configured to obtain the information required for estimation while skipping these processes is that shown in FIG. 3B.

Software Configuration for High-Speed Estimation Processing

FIG. 3B is a software module diagram in which rendering processing is skipped and thus the estimation processing is faster than the conventional time estimation processing shown in FIG. 3A. A job control unit 400 controls the print job stored in the data storage unit 150 from input until output via means including function calls and message communication. There is a PDL (A) interpretation unit 401 for each type of PDL (e.g., PostScript (registered trademark), PCL (registered trademark), and XPS (registered trademark)) that has been loaded to the image forming apparatus 100. In accordance with control by the job control unit 400, the PDL interpretation unit 401 reads PDL data from the print job stored in the data storage unit 150, and executes interpretation processing. The PDL interpretation unit 401 determines the output sheet by extracting media size information stipulated by a command in the PDL and requesting a media library 402 for output sheet information regarding a sheet with the size closest to that of the extracted media size. The media library 402 holds information on output sheets supported by the image forming apparatus. The time estimation unit 430 estimates a print time based on the information regarding the determined output sheet. The time display unit 440 is a module that displays the estimated time calculated by the time estimation unit 430 on the display apparatus 120.

With this configuration shown in FIG. 3B, an estimated time in which the sheet size for each page included in the job is reflected can be obtained without performing rendering when performing processing to estimate the required print time.

Processing for Creating Output Sheet List

Figure 4A:
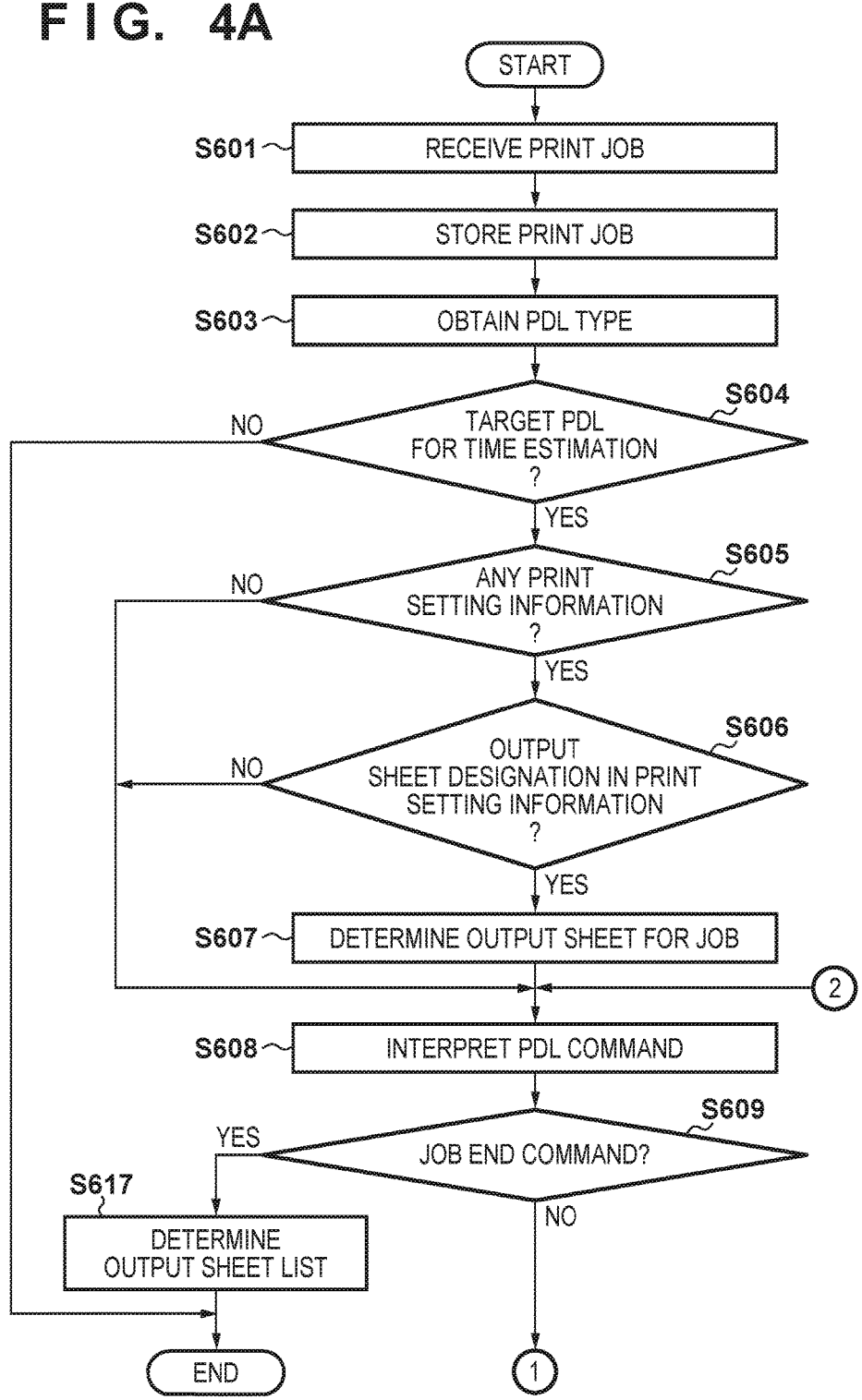
FIGS. 4A and 4B show a flowchart regarding processing from print job input until output sheet list storage according to the embodiment of the present invention.
Figure 4B:
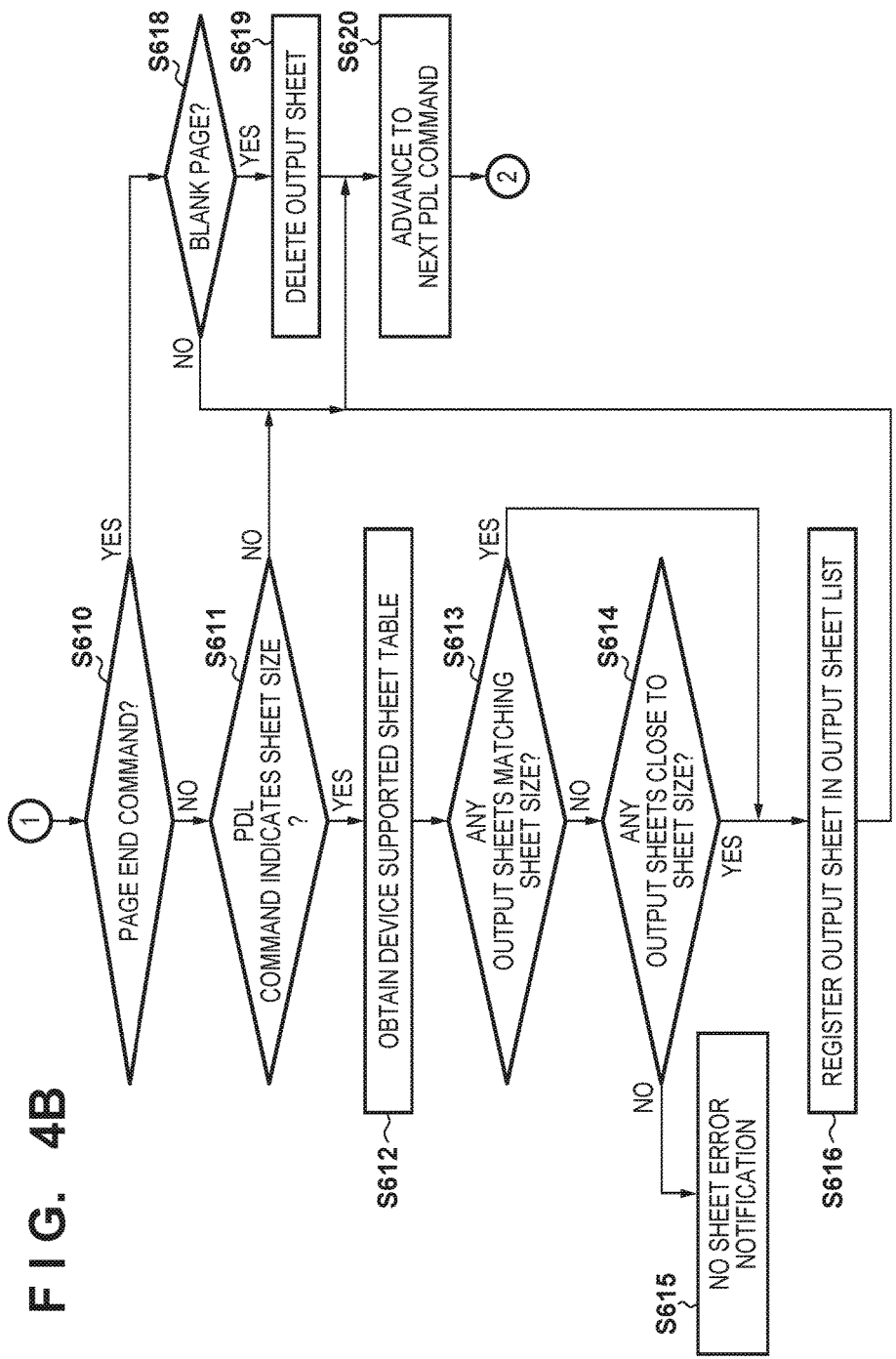

FIGS. 4A and 4B show a flowchart of the processing from print job input until output sheet list storage, which are operations performed by the software module shown in FIG. 3B, which is software that operates on the CPU 112 in the control apparatus 110 of the image forming apparatus 100. This procedure is executed by the job control unit 400 and the PDL interpretation unit 401.

In step S601, the job control unit 400 receives a print job transmitted from the PC 170 via a LAN 160, and temporarily writes the print job in the RAM 116 in the image forming apparatus 100. In step S602, the job control unit 400 stores the print job written in the RAM 116 into the data storage unit 150. In step S603, the job control unit 400 reads several bytes of data from the beginning of the PDL data included in the print job stored in the data storage unit 150, determines the type of PDL, and then obtains the result of the determination.

In step S604, depending on the obtained type of PDL, the job control unit 400 determines whether or not the PDL is a target PDL for which time estimation is to be performed. If the PDL is not a time estimation target PDL, the time estimation processing sequence ends. If the PDL is a time estimation target PDL, the procedure proceeds to step S605. PostScript (registered trademark), PDF (registered trademark), XPS (registered trademark), and the like are determined and registered in advance as target PDLs. If the PDL corresponds to a registered PDL, the PDL is determined as being a time estimation target PDL according to the procedure shown in FIGS. 4A and 4B.

In step S605, the job control unit 400 determines whether or not the number of copies, output sheet, Nup, and the like have been designated in the written print setting information regarding the print job stored in the data storage unit 150. If there is no print setting information, the procedure proceeds to PDL command interpretation processing in step S608. If there is print setting information, the procedure proceeds to step S606. In step S606, the job control unit 400 determines whether or not an output sheet has been designated based on the print setting information. If no output sheet has been designated, the procedure proceeds to the PDL command interpretation processing in step S608. If an output sheet has been designated, the procedure proceeds to step S607. In step S607, the job control unit 400 determines the output sheet of the job in accordance with the designated output sheet. The output sheet of the job is an output sheet that is applied to all pages included in a print job, excluding pages for which an output sheet has been designated.

In step S608, the job control unit 400 executes an interpretation processing request to the PDL interpretation unit 401 regarding a target PDL that is to be interpreted. The PDL data to be interpreted includes a plurality of PDL commands. The plurality of PDL commands include commands such as start job, start page, sheet size, end page, and end job. The PDL interpretation unit 401 interprets the PDL in units of PDL commands.

In step S609, the PDL interpretation unit 401 determines whether or not an interpreted command is an job end command. In the case of a job end command, the procedure proceeds to step S617. If the command is not a job end command, the procedure proceeds to step S610. In step S610, the PDL interpretation unit 401 determines whether or not the interpreted command is an end page command. In the case of an end page command, the procedure proceeds to step S618. If the command is not an end page command, the procedure proceeds to step S611. In step S611, the PDL interpretation unit 401 determines whether or not the interpreted command is a sheet size command. If the command is not a sheet size command, the procedure proceeds to step S620. If the command is a sheet size command, the procedure proceeds to step S612. The sheet size command will be described using FIGS. 6A and 6B.

In step S612, the PDL interpretation unit 401 executes an obtainment request for a device supported sheet table to the media library 302. In response to the obtainment request, the media library 302 returns a table list of sheets that the image forming apparatus 100 supports, specifically, output sheet information.

In step S613, the PDL interpretation unit 401 determines whether or not an output sheet that matches the sheet size is included in the obtained supported sheet table. If a matching output sheet is included, the procedure proceeds to step S616. Otherwise, the procedure proceeds to step S614. In step S614, the PDL interpretation unit 401 determines whether or not an output sheet with a size difference that is less than or equal to a threshold value is included in the obtained supported sheet table, the size difference being between the output sheet and the designated sheet size. If an output sheet with an appropriate size difference is not included, the procedure proceeds to step S615 because there is no output sheet, and a "no sheet" error is notified to the job control unit 400. If an output sheet with an appropriate size difference is included, the procedure proceeds to step S616. Note that, in step S613, determination may also be performed not only for size, but also for matching types. In this case, if a sheet with a matching size and type can be used, the procedure branches to step S616. Otherwise, in step S614, if a sheet with a size close to that of the sheet size designated in the job is usable, the procedure branches to step S616. Matching sheet types may also be a condition in step S614, or sheet type may be removed from the conditions in step S614.

In step S616, the PDL interpretation unit 401 sets a supported sheet with matching size or whose size difference is less than or equal to a threshold value as the output sheet, and registers the information regarding the output sheet size of the corresponding page to a list of output sheets that have been listed up. The output sheet list is held in the RAM 116.

In step S618, the PDL interpretation unit 401 determines whether or not the ended page is a blank page that does not include any rendering commands at all. If the ended page is a blank page, the procedure proceeds to step S619, or otherwise the procedure proceeds to step S620. In step S619, if the corresponding page is blank, the PDL interpretation unit 401 deletes the registered sheet from the output sheet list. In step S620, the PDL interpretation unit 401 proceeds to the next command and repeats the processing sequence.

In step S617, upon detecting a job end command, the PDL interpretation unit 401 determines the output sheet list in which output sheets for the pages of the print job are listed, and ends the processing sequence. Note that, in step S617, there is no particular need to perform processing, and information or the like indicating that the output sheet list has been determined may be added to the output sheet list. Thus, according to the procedure described above, an output sheet list that indicates the output sheet for each page included in the job is generated.

Determination of Print Estimation Time

Figure 5A:
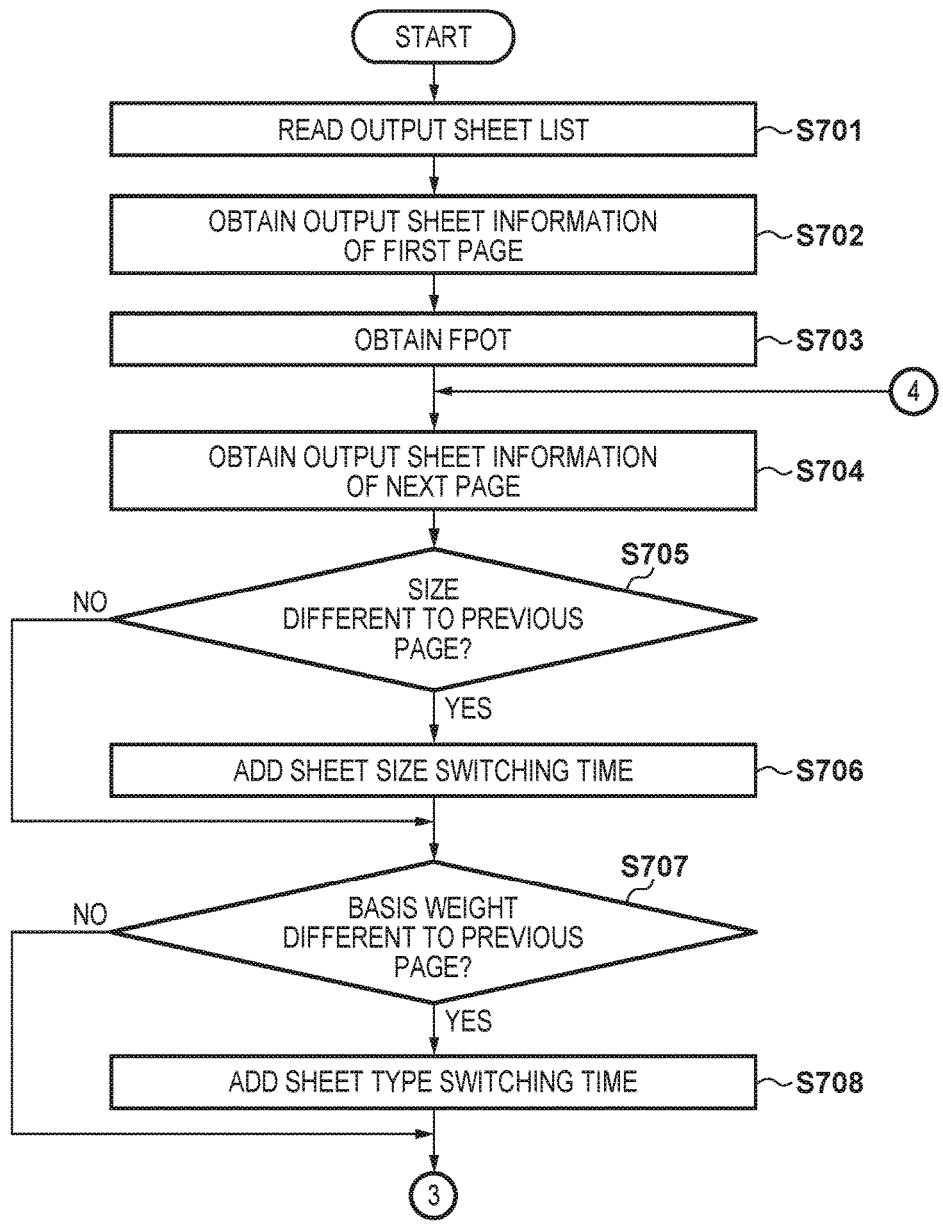

FIGS. 5A and 5B show a flowchart of processing from reading of the output sheet list until display of an estimated print time, which are operations performed by the software module shown in FIG. 3B, which is software that operates on the CPU 112 in the control apparatus 110 of the image forming apparatus 100.

In step S701, a time estimation unit 430 reads an output sheet list written in the RAM 116 in the image forming apparatus 100. In step S702, the time estimation unit 430 obtains the output sheet information regarding the first page. In step S703, the time estimation unit 430 reads a first printout time (FPOT) that corresponds to the output sheet of the first page, from the ROM 114 that includes programs of the time estimation unit 430.

In step S704, the time estimation unit 430 obtains the output sheet information regarding the next page. In step S705, the time estimation unit 430 compares the current page and the previous page, and determines whether or not the sheet sizes are different. If the sheet sizes are different, the procedure proceeds to step S706, and if the sheet sizes are the same, the procedure proceeds to step S707. In step S706, if the sheet sizes of the current page and the previous page are different, the time estimation unit 430 is required to change processes including changing the paper path from which paper is discharged by the printing apparatus 130 and the fixing temperature of the engine. Accordingly, a predetermined switching time is read from the ROM 114 that includes programs of the time estimation unit 430, and the switching time is added to the estimated time.

In step S707, the time estimation unit 430 compares the current page and the previous page, and determines whether or not the basis weight is different. If the basis weight is different, the procedure proceeds to step S708, and if the basis weight is the same, the procedure proceeds to step S709. In step S708, if the basis weight of the current page and the previous page is different, the time estimation unit 430 is required to change processes including changing the paper path from which paper is discharged by the printing apparatus 130 and the fixing temperature of the engine. Accordingly, a predetermined switching time is read from the ROM 114 that includes the programs of the time estimation unit 430, and the predetermined switching time is added to the estimated time.

In step S709, the time estimation unit 430 determines, depending on the current page, whether or not engine adjustment is to be performed at that page. The total number of output pages and the estimated amount of toner to be used for the document are considered as determination conditions. Engine adjustment includes, for example, cleaning the head every predetermined page. If it is determined that engine adjustment is to be performed at that page, the procedure proceeds to step S710, or otherwise the procedure proceeds to step S711. In step S710, if engine adjustment is to be performed, the time estimation unit 430 reads a target adjustment time from the ROM 114 that includes the programs of the time estimation unit 430, and adds the target adjustment time to the estimated time.

In step S711, the time estimation unit 430 obtains productivity information that corresponds to the output sheet information regarding the current page, from the ROM 114 that includes the programs of the time estimation unit 430. Productivity information is information that indicates the inter-sheet time from when the previous page is discharged until when the next page is discharged, and is information that is dependent on the output sheet. In step S712, the time estimation unit 430 adds the inter-sheet time read as productivity information to the estimated time.

In step S713, the time estimation unit 430 reads all of the information from the read output sheet list and determines whether or not the estimated time has been calculated. If information for all of the pages has not been read, the procedure proceeds to step S704, and repeats the processing for the number of remaining pages. If information for all of the pages has been read, the procedure proceeds to step S714. In step S714, the time estimation unit 430 reads print setting values included in the print job stored in the data storage unit 150, and determines whether or not the print settings have been set such that accessories including a finisher or a folding machine are to be used. If an accessory is to be used, the procedure proceeds to step S715, or otherwise the procedure proceeds to step S716.

In step S715, the time estimation unit 430 obtains the processing time of the accessory to be used from the ROM 114 that includes the programs of the time estimation unit 430, and adds the value of the processing time to the estimated time. Specifically, element times including the productivity of each page and the switching time are totaled to obtain the estimated time. In step S716, the time estimation unit 430 notifies a time display unit 440 of the calculated estimated print time, and the processing sequence ends.

Thus, according to the procedure described above, a required print time that corresponds to sheet size, basis weight, and accessory usage can be determined.

Description of PDL Example

FIGS. 6A and 6B are schematic diagrams showing the PDL included in a print job according to the present embodiment. The content of the determination processing as to whether "PDL command indicates sheet size?" in step S611 in FIGS. 4A and 4B will be described in further detail using a specific example. FIG. 6A is a schematic diagram showing an example in the case where PDF (registered trademark) is the type of PDL included in the print job. In FIG. 6A, the PDF command <</Type/Page/MediaBox[0 0 612 792] stipulates the use of a sheet with a sheet size whose origin is at [0, 0] and whose opposite corners are at [612, 792]. The PDL interpretation unit 401 searches the media library 402 to determine whether or not there is an output sheet that matches this size. If a matching sheet cannot be found, the PDL interpretation unit 401 searches the media library 402 to determine whether or not there are sheets with a size difference less than or equal to a predetermined value such as 5 pixels, for example, and if such sheets are found, the sheet with the smallest size difference is set as the output sheet. If there is no sheet with a size difference of 5 pixels or less, it is determined that there is no output target sheet.

FIG. 6B is a schematic diagram showing an example in the case where XPS (registered trademark) is the type of PDL included in the print job. In FIG. 6B, the XPS command <FixedPage Width="1122" Height=""793" stipulates use of a sheet with a sheet size that is 1122 pixels wide and 793 pixels high. These pixels are equivalent to that of a sheet size of 96 dpi. The PDL interpretation unit 401 searches the media library 402 to determine whether or not there is a sheet that matches this size. If a matching sheet cannot be found, the PDL interpretation unit 401 searches the media library 402 to determine whether or not there are sheets with a size difference less than or equal to a predetermined value such as 10 pixels, for example, and if such sheets are found, the sheet with the smallest size difference is set as the output sheet. If there is no sheet with a size difference of 10 pixels or less, it is determined that there is no output target sheet.

Description of Specific Example

FIGS. 7A and 7B are an output sheet list included in the print job (FIG. 7A) and a schematic diagram of a specific example showing estimated time calculation (FIG. 7B). Regarding a target PDL that is to be processed, the output sheet of the first page is stipulated as being A4 thick paper, and therefore an FPOT of an A4 thick sheet and an inter-sheet time for an A4 thick sheet are added to the estimated time. The initial value of the estimated time is set in advance as 0. The output sheet of the second page is stipulated as being A4 normal paper, and therefore the time required to switch from thick paper to normal paper and the inter-sheet time for A4 normal paper are added to the estimated time. The output sheet of the third page is stipulated as being A4 normal paper, and therefore the inter-sheet time for A4 normal paper is added to the estimated time. The output sheet of the fourth page is stipulated as being A4 normal paper, and therefore the inter-sheet time for A4 normal paper is added to the estimated time. The output sheet of the fifth page is stipulated as being A3 normal paper, and therefore the time required to switch from A4 to A3 paper and the inter-sheet time for A3 paper are added to the estimated time. The output sheet of the sixth page is stipulated as being A4 normal paper, and therefore the time required to switch from A3 to A4 paper and the inter-sheet time for A4 paper are added to the estimated time. The output sheet of the seventh page is stipulated as being A4 thick paper, and therefore the time required to switch from normal paper to thick paper and the inter-sheet time for A4 thick paper are added to the estimated time. Also, if staple settings are included in the print settings, the processing time for stapling is also added to the estimated time. The values to be added are values that have respectively been determined in advance and stored in the ROM 114 and the like in association with sheet size and the like. In this way, a required print time can be accurately and quickly obtained.

FIG. 8 is a table showing the results of the effect of shortening the time from print job input until estimated print time display, according to the embodiment of the present invention. Compared to the conventional method, in the present embodiment, processing by the intermediate data generation unit 310 and the rendering processing unit 320 can be skipped, and therefore processing speed is increased by an amount equivalent to the time that intermediate data processing and rendering processing would have taken. As shown in FIG. 8, the required time has been shortened to tenths or to several tenths of the conventional required time. Accordingly, the user can be promptly notified of the estimated time 205, and the user can quickly comprehend how long it will take to print the job that he or she is trying to print.

OTHER EMBODIMENTS

In the above embodiment, an example of an image forming apparatus that has the function of obtaining a required print time for a stored job was described. However, estimation of required time according to the present embodiment does not involve rendering, and therefore a required print time of a print job can be obtained by executing the procedures shown in FIGS. 4 and 5 using not only an image forming apparatus but also an information processing apparatus such as a computer that does not have rendering hardware. In this case, the media library 402 is obtained from the printer that will be used or is alternatively set in advance on the computer. Note that it is also conceivable for the image forming apparatus of the present embodiment to be an apparatus constituted by combining the above-described information processing apparatus with hardware and software for rendering and marking.

Also, in the present embodiment, the element times were described as being FPOT, inter-sheet time, switching time, adjustment time, accessory processing time, and the like for each sheet size, but if other times are required for printing, required times therefor may also be included as element times. In particular, by including a required time that varies according to the sheet size and sheet quality for each page, the present invention enables this time to be reflected in the required print time of the job and highly accurate estimation is possible.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-061664, filed Mar. 24, 2015 which is hereby incorporated by reference herein in its entirety.

What is claimed is:

1. A printing apparatus comprising:
   a controller having at least one processor, wherein the controller:
   receives, from an external apparatus, a print job for printing a plurality of images on a plurality of sheets,
   estimates, before executing the received print job, a time required for completion of the received print job, based on at least respective sizes of the plurality of sheets, and
   executes the received print job; and
   a memory which stores predetermined values which are used for the estimation of the time required for completion of the received print job,
   wherein the predetermined values include at least (i) a predetermined sheet change time required for a sheet change from a sheet of a first predetermined size to a next sheet of a second predetermined size larger than the first predetermined size, and (ii) another predetermined sheet change time required for another sheet change from a sheet of the second predetermined size to a next sheet of the first predetermined size, wherein the sheet change and the other sheet change are to be performed by the printing apparatus,
   wherein, in the estimation of the time required for completion of the received print job, the controller checks sizes of every two consecutive sheets of the plurality of sheets, and uses one or more of at least (i) the stored predetermined sheet change time and (ii) the stored other predetermined sheet change time based on the checking of sizes of every two consecutive sheets of the plurality of sheets.

2. The printing apparatus according to claim 1, further comprising:
   a storage which stores the print job received from the external apparatus, and
   a user interface which accepts, from a user after the print job is stored in the storage, a print instruction for the print job which has been stored in the,
   wherein the controller performs the estimation before accepting of the print instruction via the user interface, and
   wherein the user interface notifies the user of the time information for the print job corresponding to the time estimated by the controller.

3. The printing apparatus according to claim 1, wherein the estimation of the time required for completion of the print job adds, into a currently estimated time, the predetermined sheet change time for the sheet change for each of the number of sheet changes and adds, into a currently estimated time, the other predetermined sheet change time for the other sheet change for each of the number of other sheet changes.

4. The printing apparatus according to claim 1, wherein, in the estimation, neither the predetermined sheet change time nor the other predetermined sheet change time is added into a currently estimated time if no sheet change from a sheet of a size to a next sheet of a different size will occur within the print job.

5. The printing apparatus according to claim 1, wherein, in the estimation, the controller adds the stored predetermined sheet change time into a currently estimated time N times, where N is a number of times the print job will require the sheet change from a sheet of the first predetermined size to a next sheet of the second predetermined size, and adds the stored predetermined sheet change time into the currently estimated time M times, where M is a number of times the print job will require the other sheet change from a sheet of the second predetermined size to a sheet of the first predetermined size.

6. The printing apparatus according to claim 5, wherein the print job includes at least one of sheet size setting information and a PDL command that designates a size of a sheet on which an image is to be printed, and
   wherein, in the estimation, the controller checks the respective sizes of the plurality of sheets by analyzing the print job.

7. The printing apparatus according to claim 1, further comprising a printer configured to print the plurality of images onto the plurality of sheets, in accordance with a print instruction accepted after the print job is received.

8. The printing apparatus according to claim 1, further comprising a printer configured to print the plurality of images onto the sheets, wherein the printer performs predetermined processing for the sheet size change, including adjustment processing.

9. The printing apparatus according to claim 1, wherein the predetermined sheet change time is a time which will be additionally required for conveying the sheet of the second predetermined size next to the sheet of the first predetermined size, and the other predetermined sheet change time is a time which will be additionally required for conveying the sheet of the first predetermined size next to the sheet of the second predetermined size.

10. The printing apparatus according to claim 1, wherein, in order to estimate the time required for completion of the print job, the controller adds another predetermined time, which is included in the predetermined values, representing a time required to print a beginning sheet of the plurality of sheets into a currently estimated time.

11. A method which is performed by a controller of a printing apparatus, comprising:
  receiving a print job for printing a plurality of images on a plurality of sheets from an external apparatus;
  storing, in a memory, predetermined values which are used for estimation of time required for completion of the received print job;
  estimating, before executing the received print job, a time required for completion of the received print job, based on at least respective sizes of the plurality of sheets; and
  executing the received print job,
  wherein the predetermined values include at least (i) a predetermined sheet change time required for a sheet change from a sheet of a first predetermined size to a next sheet of a second predetermined size larger than the first predetermined size, and (ii) another predetermined sheet change time required for another sheet change from a sheet of the second predetermined size to a next sheet of the first predetermined size, where the sheet change and the other sheet change are to be performed by the printing apparatus, and
  wherein, in the estimation of the time required for completion of the received print jobs, sizes of every two consecutive sheets of the plurality of sheets are checked, and one or more of at least (i) the stored predetermined sheet change time and (ii) the stored other predetermined sheet change time are used based on the checked sizes of every two consecutive sheets of the plurality of sheets.

12. The method according to claim 11, further comprising:
  accepting, from a user, a print instruction for the stored print job for which the time required for completion of the print job has been estimated;
  printing the plurality of images on the sheets, in accordance with the accepted print instruction; and
  notifying, before the accepting of the print instruction from the user, the user of information based on the estimated time required for completion of the print job.

13. The method according to claim 11, further comprising performing predetermined processing, using a printer that prints the plurality of images onto the sheets, wherein predetermined processing for each of the sheet change and the other sheet change includes adjustment processing.

14. A printing apparatus comprising:
  a controller that:
    receives, from an external apparatus, a print job for printing images on a plurality of sheets;
    estimates a print time of the received print job, and
    executes the received print job; and a memory that stores predetermined values which the controller uses for estimating the print time of the received print job,
  wherein the stored predetermined values include (i) one predetermined sheet change time for a sheet change from a sheet of a first size to a next sheet of a second size larger than the first size, and (ii) another predetermined sheet change time for another sheet change from a sheet of the second size to a next sheet of the first size.

15. The printing apparatus according to claim 14, wherein, in the estimation of the print time of the received print job, the controller checks sizes of every two consecutive sheets of the plurality of sheets, and uses one or more of at least (i) the one predetermined sheet change time and (ii) the other predetermined sheet change time based on a result of the checking of sizes of every two consecutive sheets of the plurality of sheets.

16. The printing apparatus according to claim 14, further comprising:
  a user interface,
  wherein the user interface receives, after the print job is received from the external apparatus, a print instruction for the received print job from a user, and
  wherein the controller performs, before the user interface receives the print instruction from the user, the estimation of the print time of the received print job.

17. The printing apparatus according to claim 16,
  wherein the user interface includes a display, and
  wherein the controller displays on the display, before the user interface receives the print instruction from the user, time information based on the estimated print time of the received print job.

18. The printing apparatus according to claim 17,
  wherein the user interface is a touch screen device including the display,
  wherein the touch screen device:
    displays a list of to-be executed print jobs including at least the received print job, and
    receives from the user, as the print instruction for the received print job, a selection of the received print job from the displayed list and a print start instruction of the selected received print job, and
  wherein the touch screen device further displays, in the list, the time information based on the estimated print time of the received print job, in association with the received print job.

19. The printing apparatus according to claim 14, wherein the sheet change and the other sheet change are performed within the received print job by the printing apparatus.

20. The printing apparatus according to claim 14, wherein the one predetermined sheet change time is a time which will be additionally required for conveying the sheet of the second size next to the sheet of the first size, and the other predetermined sheet change time is a time which will be additionally required for conveying the sheet of the first size next to the sheet of the second size.

21. The printing apparatus according to claim 14, wherein the one predetermined sheet change time is a time which will be required for an additional process to be performed between conveyance of the sheet of the first size and conveyance of the sheet of the second size in order to convey the sheet of the second size next to the sheet of the first size, and
  the other predetermined sheet change time is a time which will be required for another additional process to be performed between conveyance of the sheet of the second size and conveyance of the sheet of the first size in order to convey the sheet of the first size next to the sheet of the second size.

22. The printing apparatus according to claim 21, wherein
the additional process performs, between conveyance of the sheet of the first size and conveyance of the sheet of the second size, at least one of preparation for conveying the next sheet of the second size and fixing temperature control for the next sheet of the second size, and
the other additional process performs, between conveyance of the sheet of the second size and conveyance of the sheet of the first size, at least one of preparation for conveying the next sheet of the first size and fixing temperature control for the next sheet of the first size.

23. The printing apparatus according to claim 14, wherein, in the estimation of the print time of the received print job, the controller adds the one predetermined sheet change time to a current print time for each sheet change from the first size to the second size, and adds another predetermined sheet change time to the current time for each sheet change from the second size to the first size.

24. The printing apparatus according to claim 14, wherein, in the estimation of the print time of the received print job, the controller estimates the print time of the received print job using the one predetermined sheet change time in accordance with a number of sheet changes from the sheet of the first size to the sheet of the second size and using the other predetermined sheet change time in accordance with a number of sheet changes from the sheet of the second size to the sheet of the first size.

25. The printing apparatus according to claim 14, wherein the controller estimates the print time of the received print job before executing the received print job.

26. A method which is performed by a printing apparatus, comprising:
Receiving, from an external apparatus, a print job for printing images on a plurality of sheets;
estimating a print time of the received print job;
executing the received print job; and
storing in a memory predetermined values which the controller uses for estimating the print time of the received print job,
wherein the stored predetermined values include (i) one predetermined sheet change time for a sheet change from a sheet of a first size to a next sheet of a second size larger than the first size, and (ii) another predetermined sheet change time for another sheet change from a sheet of the second size to a next sheet of the first size.

27. The method according to claim 26, wherein, in the estimation of the print time of the received print job, sizes of every two consecutive sheets of the plurality of sheets are checked, and one or more of at least (i) the one predetermined sheet change time, and (ii) the other predetermined sheet change time are used based on a result of the checking of sizes of every two consecutive sheets of the plurality of sheets.

28. The method according to claim 26, further comprising:
receiving on a user interface, after the print job is received from the external apparatus, a print instruction for the received print job from a user; and
performing, before receiving the print instruction from the user on the user interface, the estimation of the print time of the received print job.

29. The method according to claim 26,
wherein the user interface includes a display, and
wherein the method further comprises displaying on the display, before receiving the print instruction from the user on the user interface, time information based on the estimated print time of the received print job.

30. The method according to claim 29,
wherein the user interface is a touch screen device including the display,
wherein the method further comprises:
displaying a list of to-be executed print jobs including at least the received print job on the touch screen device;
receiving from the user, as the print instruction for the received print job, a selection of the received print job from the displayed list and a print start instruction of the selected received print job; and
further displaying, in the list on the touch screen device, the time information based on the estimated print time of the received print job, in association with the received print job.

31. The method according to claim 26, wherein the sheet change and the other sheet change are performed within the received print job by the printing apparatus.

32. The method according to claim 26, wherein
the one predetermined sheet change time is a time which will be additionally required for conveying the sheet of the second size next to the sheet of the first size, and
the other predetermined sheet change time is a time which will be additionally required for conveying the sheet of the first size next to the sheet of the second size.

33. The method according to claim 26, wherein
the one predetermined sheet change time is a time which will be required for an additional process to be performed between conveyance of the sheet of the first size and conveyance of the sheet of the second size in order to convey the sheet of the second size next to the sheet of the first size, and
the other predetermined sheet change time is a time which will be required for another additional process to be performed between conveyance of the sheet of the second size and conveyance of the sheet of the first size in order to convey the sheet of the first size next to the sheet of the second size.

34. The method according to claim 33, wherein
the additional process performs, between conveyance of the sheet of the first size and conveyance of the sheet of the second size, at least one of preparation for conveying the next sheet of the second size and fixing temperature control for the next sheet of the second size, and
the other additional process performs, between conveyance of the sheet of the second size and conveyance of the sheet of the first size, at least one of preparation for conveying the next sheet of the first size and fixing temperature control for the next sheet of the first size.

35. The method according to claim 26, wherein, in the estimation of the print time of the received print job, the one predetermined sheet change time is added to a current print time for each of sheet changes from the first size to the second size, and another predetermined sheet change time is added to the current time for each of sheet changes from the second size to the first size.

36. The method according to claim 26, wherein, in the estimation of the print time of the received print job, the print time of the received print job is estimated using the one predetermined sheet change time in accordance with a number of times of the sheet changes from the sheet of the first size to the sheet of the second size and using the other predetermined sheet change time in accordance with a number of times of the sheet changes from the sheet of the second size to the sheet of the first size.

37. The method according to claim 26, wherein the print time of the received print job is estimated before executing the received print job.

\* \* \* \* \*